(12) United States Patent  (10) Patent No.: US 6,658,111 B2
Nagashima  (45) Date of Patent: Dec. 2, 2003

(54) SMALL-SIZED OPENING AND CLOSING DEVICE

(75) Inventor: Isao Nagashima, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 509 days.

(21) Appl. No.: 09/761,058

(22) Filed: Jan. 16, 2001

(65) Prior Publication Data
US 2001/0016474 A1 Aug. 23, 2001

(30) Foreign Application Priority Data
Jan. 21, 2000 (JP) ......................... 2000-013535

(51) Int. Cl.$^7$ .............................. H04M 1/00; E05F 1/08
(52) U.S. Cl. ..................................... 379/433.13; 16/303
(58) Field of Search ................. 379/433.13; 455/575.3; 16/303, 341, 256, 277

(56) References Cited

U.S. PATENT DOCUMENTS 5,937,062 A * 8/1999 Sun et al. ............... 379/433.13
6,065,187 A * 5/2000 Mischenko ............ 379/433.13
6,175,990 B1 * 1/2001 Kato et al. ............. 379/433.13
6,195,431 B1 * 2/2001 Middleton ............. 379/433.13

* cited by examiner

Primary Examiner—Jack Chiang
(74) Attorney, Agent, or Firm—Notaro & Michalos P.C.

(57) ABSTRACT

In order to attain a small-sized opening and closing device suitable for use especially with a portable telephone which is so constructed to reduce cost by minimizing the number of parts to simplify the structure thereof, and to achieve a light pushing operation on a push-button, the present invention is composed of a shaft, a slider cam attached to the shaft slidably in an axial direction, having a cam portion in one end portion, a first compression spring interposed resiliently between the slider cam and the shaft, an inner cam attached rotatably relative to the shaft, having a cam portion disposed on a side thereof facing the cam portion of the slider cam, an outer cam attached to the shaft, accommodating the inner cam rotatably therein, with a cam portion thereof provided on a side facing the cam portion of the slider cam, a slide key disposed non-rotatably and slidably in an axial direction relative to the outer cam, for arresting and releasing the inner cam, a push-button disposed in one end portion of the slide key, and a second compression spring interposed resiliently between the push-button and/or the slide key and the outer cam, with a weaker resilient force than that of the first compression spring.

6 Claims, 12 Drawing Sheets

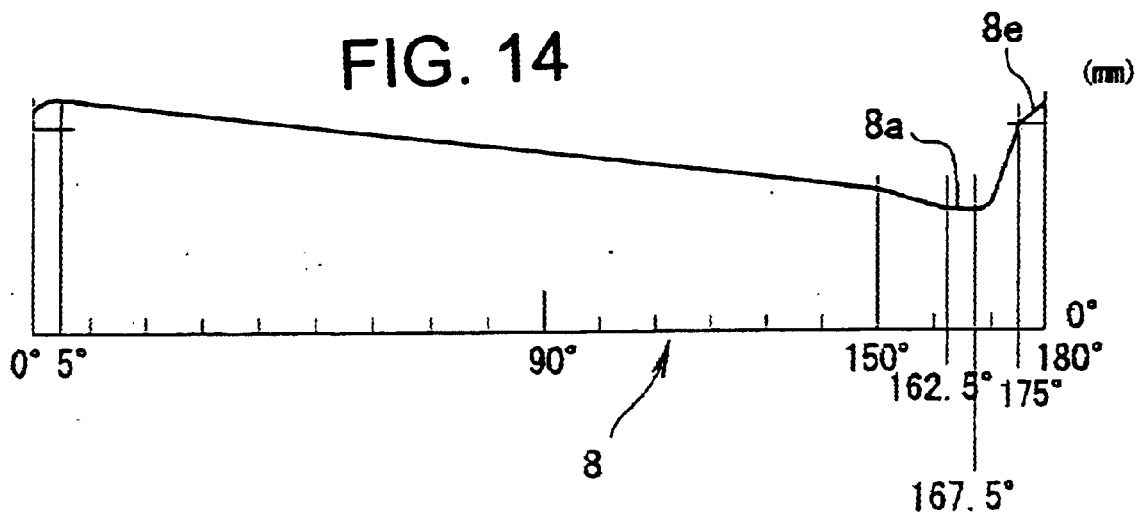
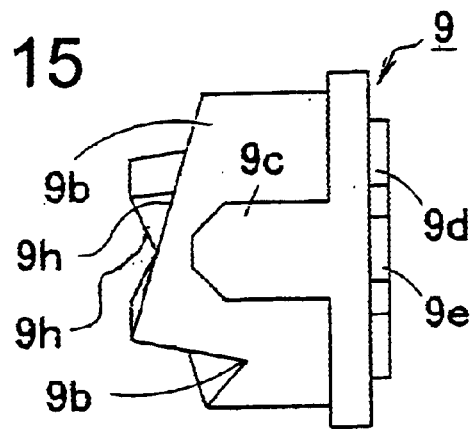
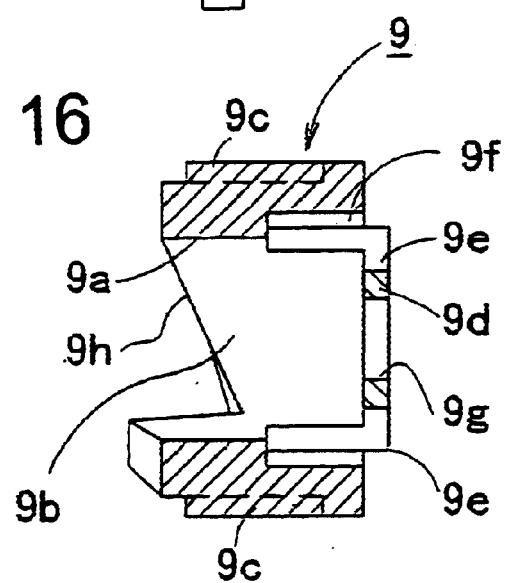

SMALL-SIZED OPENING AND CLOSING DEVICE

FIELD OF THE INVENTION

The present invention relates to a small-sized opening and closing device suitable for use especially with a portable telephone having an opening and closing mechanism.

DESCRIPTION OF RELATED ART

Conventionally, a portable telephone where a transmitter section and a receiver section, or a keyboard side and a display side, thereof are mounted separately on a fixed side body and a movable side body respectively to be folded in two and opened and closed relative to each other, is known, and for this purpose, such an opening and closing device is known as shown, for example, in Japanese Patent Laid-open No. 8-125725, wherein a torsion spring wound spirally around a shaft is interposed resiliently between a mounting portion of the fixed side body and a mounting portion of the movable side body connected with each other via the shaft so as to be folded in two freely, and an arresting means for engaging one end portion of the torsion spring with the mounting portion of the movable side body only within a predetermined opening angle of the receiver section, is provided between the mounting portion of the fixed side body and the mounting portion of the movable side body while a cam mechanism is provided between the mounting portion of the fixed side body and the mounting portion of the movable side body, whereby the cam mechanism is operated by pushing a push-button disposed in an axial direction of the mounting portion of the fixed side body to rotate the receiver section to the position in which the arresting means arrests one end portion of the torsion spring, and wherein a locking means is provided for releasing the engagement of the movable side body with the mounting portion of the fixed side body by pushing the push-button against the mounting portion of the movable side body while a friction mechanism is provided for stopping the movable side body in a free stopping way when and after it reaches a predetermined opening angle, so that the movable side body is opened automatically to a predetermined angle relative to the fixed side body by pushing the push-button in a push style.

As the above-described conventionally known opening and closing device of a push type requires many parts and the structure thereof is complicated, there have been disadvantages that it often has trouble and is expensive.

SUMMARY OF THE INVENTION

An object of the present invention is to provide a small-sized opening and closing device suitable for use especially with a portable telephone which is so constructed to reduce cost by minimizing the number of parts to simplify the structure thereof, as well as to enable a push-button to be pushed lightly.

In order to achieve the above-mentioned object, the present invention is composed of a shaft, a slider cam attached to the shaft slidably in an axial direction, having a cam portion in one end portion thereof, a first compression spring interposed resiliently between the slider cam and the shaft, an inner cam attached rotatably relative to the shaft, having a cam portion provided on a side thereof facing the cam portion of the slider cam, an outer cam attached to the shaft with the inner cam accommodated rotatably therein and with a cam portion thereof facing the cam portion of the slider cam, a slide key attached non-rotatably and slidably in an axial direction relative to the outer cam, for arresting and releasing the inner cam, a push-button disposed in one end portion of the slide key, and a second compression spring with a weaker resilient force than that of the first compression spring, which is interposed resiliently between the push-button and/or the slide key and the outer cam, so that the length in an axial direction is shortened by having the inner cam for controlling the rotation of the slider cam, or the rotation of the shaft, accommodated inside the outer cam, and the push-button can be pushed lightly by using a coil spring for the push-button.

Here, the present invention can be so constructed to produce a state in which the inner cam is arrested by or released from the outer cam by providing on one side portion of the slide key an arresting leg portion having an arresting portion in a tip thereof, and by fitting the arresting portion slidably into a key groove disposed inside the outer cam while having the arresting portion fit into or removed from an arresting groove disposed in a flange portion provided in an outer circumference of the inner cam.

The present invention can also be so constructed to rotate the inner cam to return to its original position by providing a chamfered portion in the arresting portions of the slide key when the arresting portion is fit into the arresting groove of the inner cam due to the chamfered portion.

Furthermore, the present invention can be so constructed to fix the shaft engageably to a mounting hole disposed in a mounting portion of a movable side body, and fix the outer cam engageably to a mounting hole disposed in a mounting portion of a fixed side body.

BRIEF DESCRIPTION OF THE DRAWINGS

FIG. 14 is an expanded view of a cam of the inner cam;

FIG. 15 is a front view of an outer cam;

FIG. 16 is a sectional plane view of the outer cam;

EMBODIMENT

Figure 1:
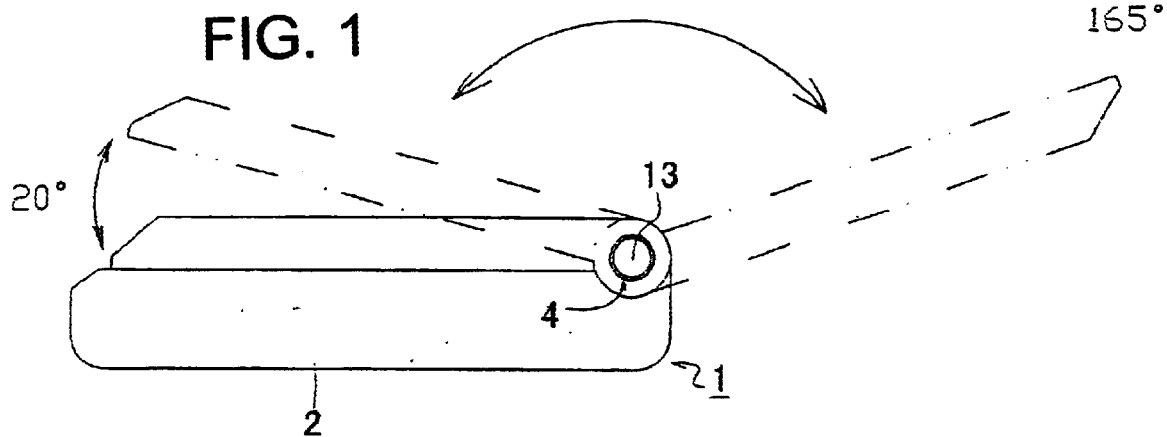
FIG. 1 is a side elevational view of a portable telephone using a small-sized opening and closing device according to the present invention.
Figure 2:
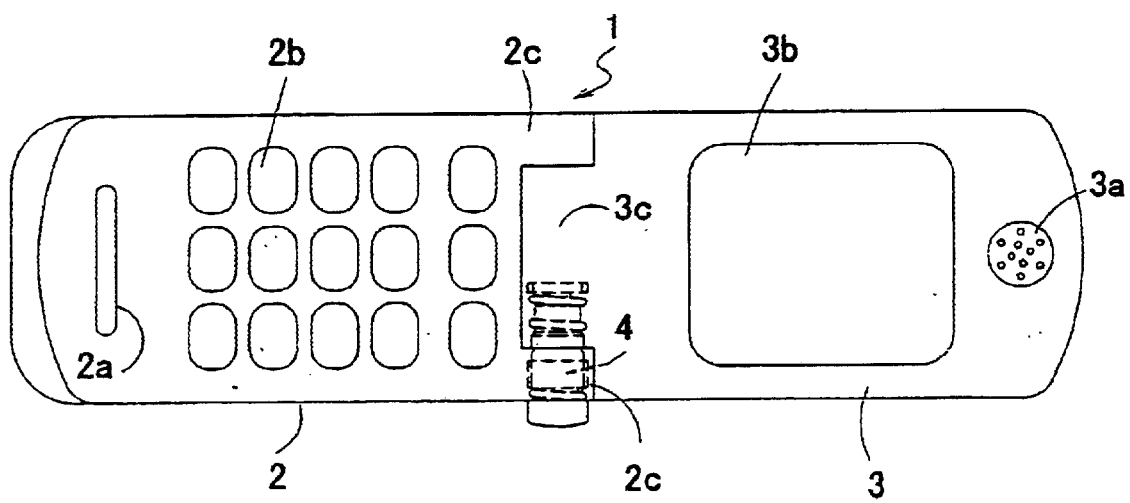
FIG. 2 is a plane view of the portable telephone shown in FIG. 1 viewed with a movable side body thereof opened.

The drawings show one embodiment of the present invention, where a reference number 1, for example, denotes a portable telephone in FIG. 1 and FIG. 2, and a reference number 2 denotes a fixed side body which constructs a transmitter section thereof. In the fixed side body 2 there are provided, for example, a small-sized microphone 2a and a keyboard 2b. A reference number 3 denotes a movable side body which constructs a receiver section of the portable telephone 1, where a small-sized speaker 3a, for example, and a display portion 3b composed of, for example, a liquid crystal display are disposed. The fixed side body 2 and the movable side body 3 have mounting portions 2c and 3c disposed to project from respective end portions thereof, and in this embodiment, with the mounting portion 3c inserted between the mounting portions 2c and 2c to combine with each other, they are connected with each other to open and close by an opening and closing device 4 which connects each of the mounting portions 2c and 2c and the mounting portion 3c in an axial direction.

Figure 3:
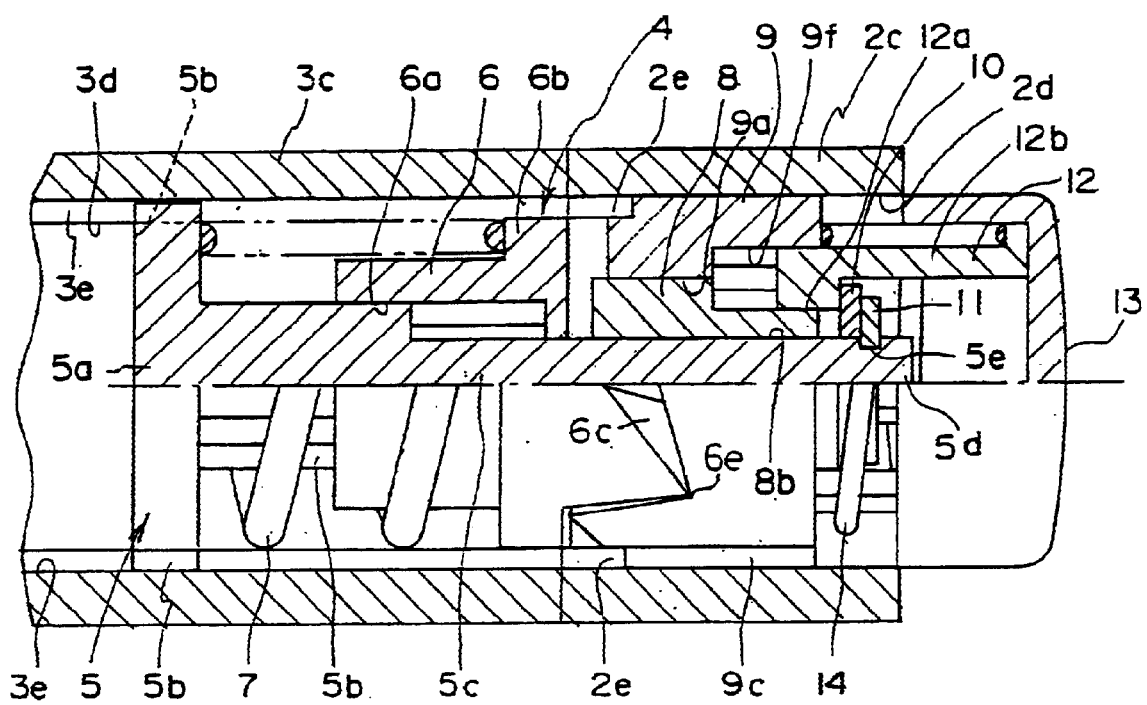
FIG. 3 is a sectional plane view of a part of the small-sized opening and closing device according to the present invention.
Figure 4:
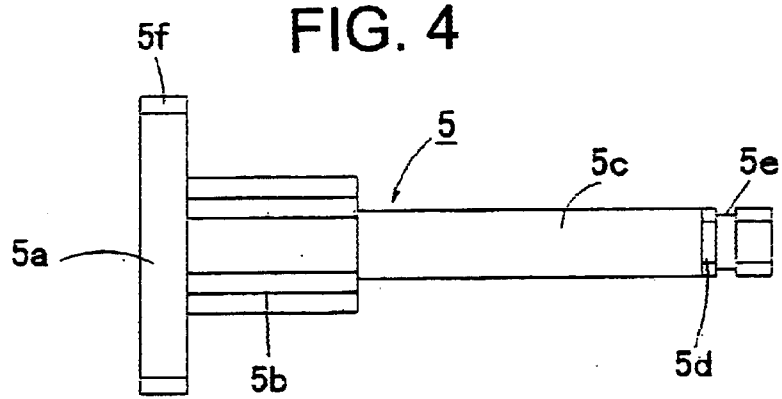
FIG. 4 is a plane view of a shaft.
Figure 5:
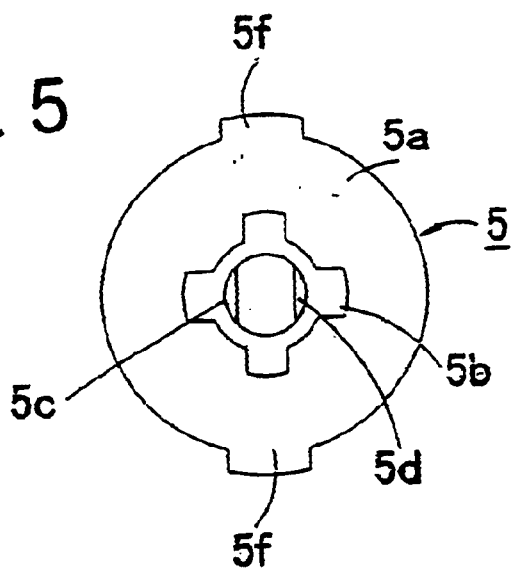
FIG. 5 is a right side view of the shaft.

The composition of the opening and closing device 4 is shown in FIG. 3 to FIG. 21. As especially shown in FIG. 3 to FIG. 5, a reference number 5 denotes a shaft having a flange portion 5a with a long diameter in one end portion thereof, an engaging portion 5b with a substantially cross-shaped section adjacent to the flange portion 5a, and a small-diameter portion 5c adjacent to the engaging portion 5b, and on a free end side of the small-diameter portion 5c there are disposed a deformed portion 5d and a circumferential groove 5e for arresting an E ring. As shown in FIG. 3, a slider cam 6 is attached slidably in an axial direction with the engaging portion 5b of the shaft 5 engageably passing through an engaging hole 6a with a substantially cross-shaped section, which is provided in a center thereof in an axial direction, and with the small-diameter portion 5c passing through a through hole 6d.

The slider cam 6, which has, as especially shown in FIG. 7 to FIG. 10, a flange portion 6b on one end portion side thereof and a pair of convex inclined cam portions 6c and 6c projecting in an axial direction of an end face of the flange portion 6b, is biased slidably in the right direction in the drawing by interposing resiliently a first compression spring 7 spirally wound around the engaging portion 5b between the flange portion 5a of the shaft 5 and the flange portion 6b thereof. The slider cam 6 and the shaft 5, as especially shown in FIG. 2 and FIG. 3, are inserted inside a mounting hole 3d disposed in the mounting portion 3c of the movable side body 3, and a pair of arresting projections 5f and 5f disposed in an axial direction of an outer circumference of the flange portion 5a are engaged with engaging grooves 3e and 3e disposed inside the mounting hole 3d.

As especially shown in FIG. 3, an inner cam 8, which has a pair of concave inclined cam portions 8a and 8a (See FIG. 11) engageably facing a pair of the convex inclined cam portions 6c and 6c of the slider cam 6, is attached with the small-diameter portion 5c of the shaft 5 passing rotatably through a through hole 8b provided in a center portion thereof in an axial direction, and an outer cam 9 accommodating the inner cam 8 rotatably inside an accommodating hole 9a disposed therein has a pair of concave inclined cam portions 9b and 9b (See FIG. 15), which are disposed in one end portion thereof, engageably facing the convex inclined cam portions 6c and 6c of the slider cam 6, while having the small-diameter portion 5c of the shaft 5 rotatably passing through a through hole 9g. The outer cam 9, as especially shown in FIG. 2 and FIG. 3, accommodated inside a mounting hole 2d disposed in one of the mounting portions 2c and 2c of the fixed side body 2, has arresting projections 9c and 9c, which are disposed in an outer circumference thereof in an axial direction, engaged with engaging grooves 2e and 2e disposed inside the mounting hole 2d.

Figure 6:
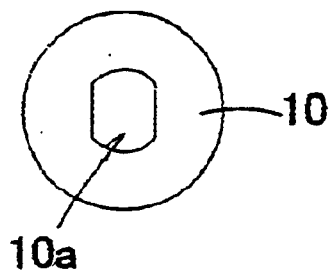
FIG. 6 is a side view of a washer.
Figure 7:
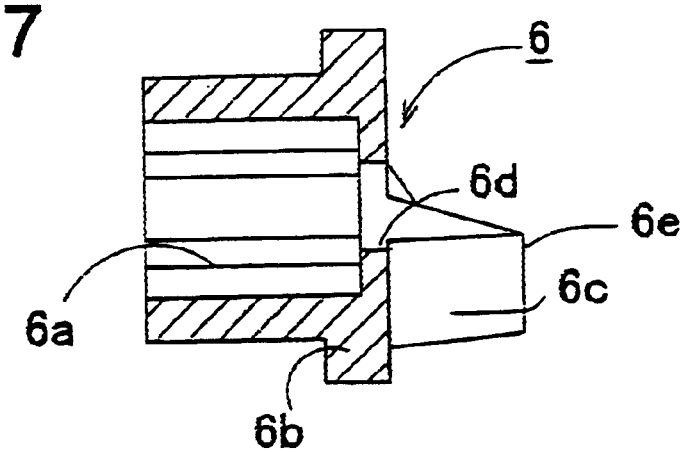
FIG. 7 is a sectional front view of a slider cam.
Figure 8:
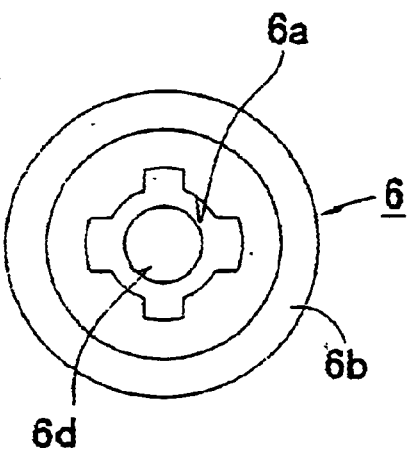
FIG. 8 is a left side view of the slider cam.
Figure 9:
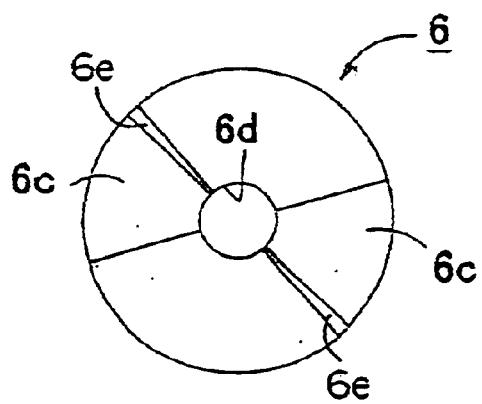
FIG. 9 is a right side view of the slider cam.
Figure 10:
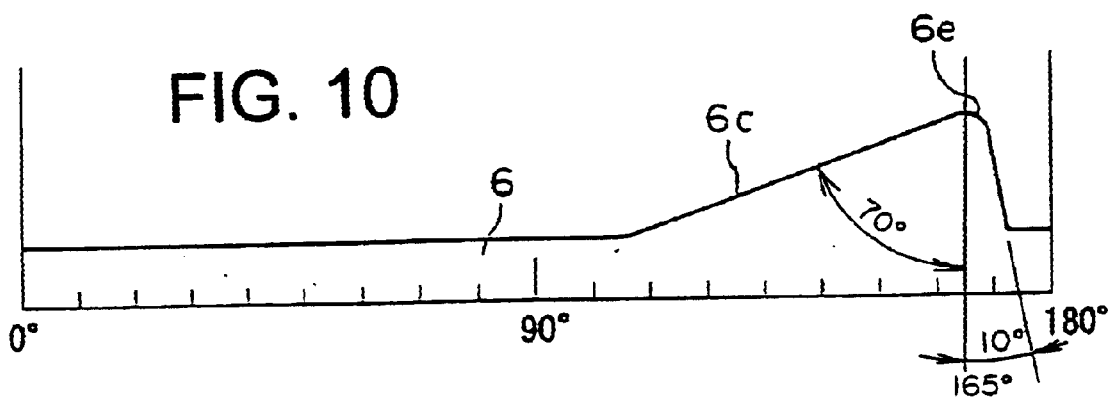
FIG. 10 is an expanded view of a cam of the slider cam.

A reference number 10 denotes a washer for preventing the outer cam 9 from coming off the shaft 5 and arresting a slide key described below, having, as especially shown in FIG. 6, a deformed through hole 10a provided in a center portion thereof, with the deformed portion 5d of the small-diameter portion 5c of the shaft 5 engageably passing through the deformed through hole 10a, as especially shown in FIG. 3, while being arrested in the small-diameter portion 5c of the shaft 5 by the E ring 11 fit tightly in the circumferential groove 5e of the shaft 5.

Figure 11:
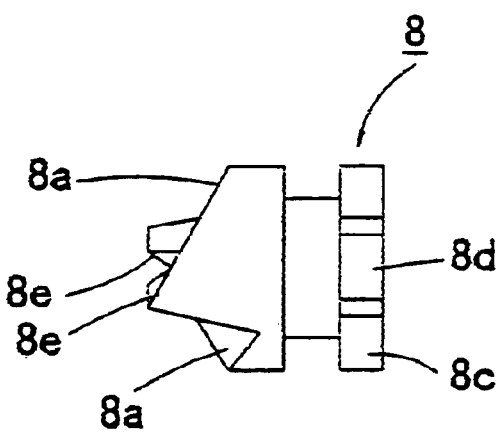
FIG. 11 is a front view of an inner cam.
Figure 12:
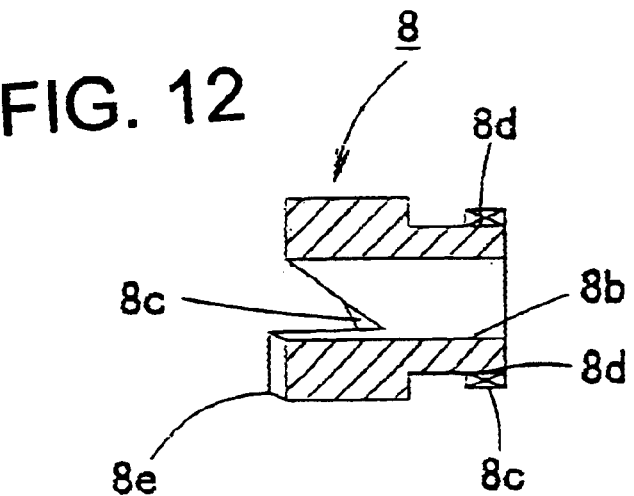
FIG. 12 is a sectional plane view of the inner cam.
Figure 13:
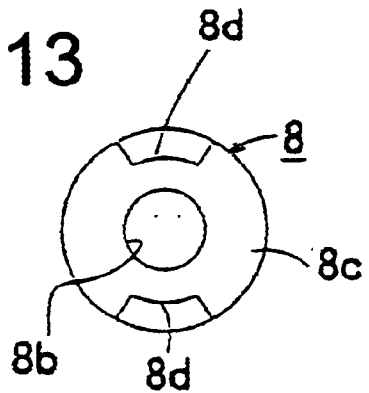
FIG. 13 is a right side view of the inner cam.
Figure 17:
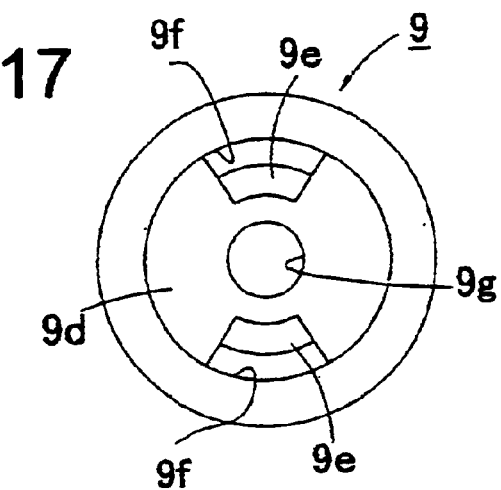
FIG. 17 is a right side view of the outer cam.
Figure 18:
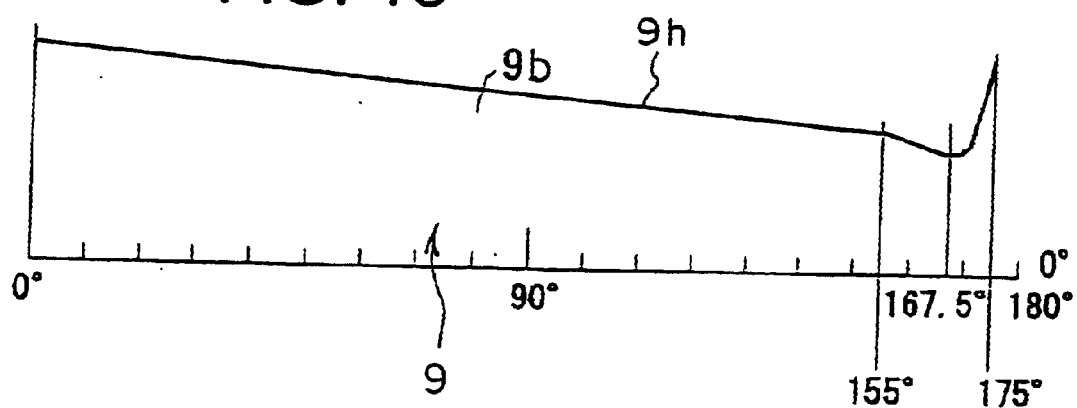
FIG. 18 is an expanded view of a cam of the outer cam.
Figure 19:
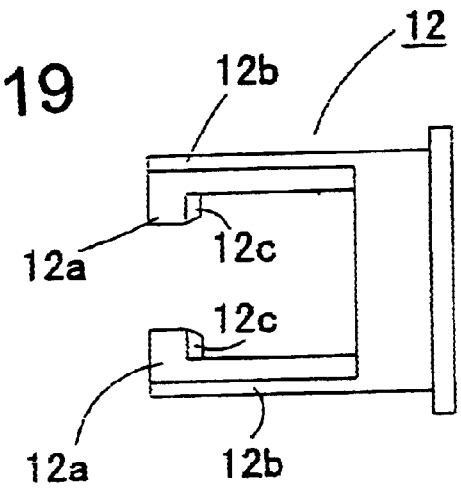
FIG. 19 is a plane view of a slide key.
Figure 20:
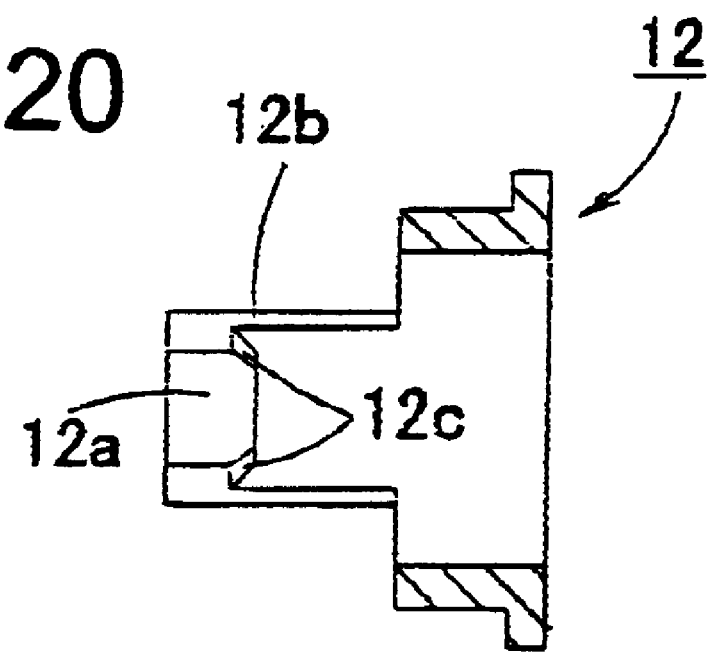
FIG. 20 is a sectional front view of the slide key.
Figure 21:
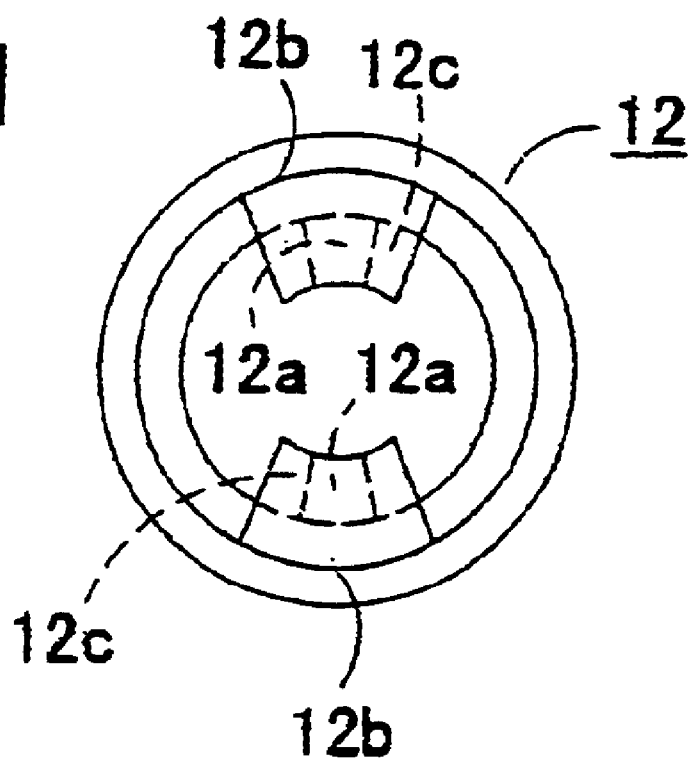
FIG. 21 is a left side view of the slide key.

As especially shown in FIG. 3, a reference number 12 denotes the cylindrical slide key with a push-button 13 disposed at one end portion side thereof, wherein a specialized second compression spring 14 spirally wound around it with a weaker resilient force than that of another first compression spring 7, is interposed resiliently between it and the outer cam 9. The slide key 12 includes, as especially shown in FIG. 19, a pair of arresting leg portions 12b and 12b having arresting portions 12a and 12a respectively in tips thereof, wherein the arresting portions 12a and 12a, as shown in FIG. 3, are inserted inside the outer cam 9 through inserting holes 9e and 9e disposed in a bottom plate 9d of the outer cam 9. Note that in the arresting portions 12a and 12a, there are disposed, as shown in FIG. 19 and FIG. 20, chamfered portions 12c and 12c in one end portions thereof. The arresting portions 12a and 12a are arrested by the washer 10 so as not to come off to the right side in an axial direction as described above, while engaging with key grooves 9f and 9f, as shown in FIG. 3, disposed in an inner circumference of the outer cam 9, so that they are so constructed, as shown in FIG. 11 to FIG. 13, to arrest the rotation of the inner cam 8 by engaging with arresting grooves 8d and 8d disposed in a flange portion 8c provided in an outer circumference of one end portion thereof, or allow the rotation of the inner cam 8 by being released from them, depending on the position thereof.

Figure 22A:
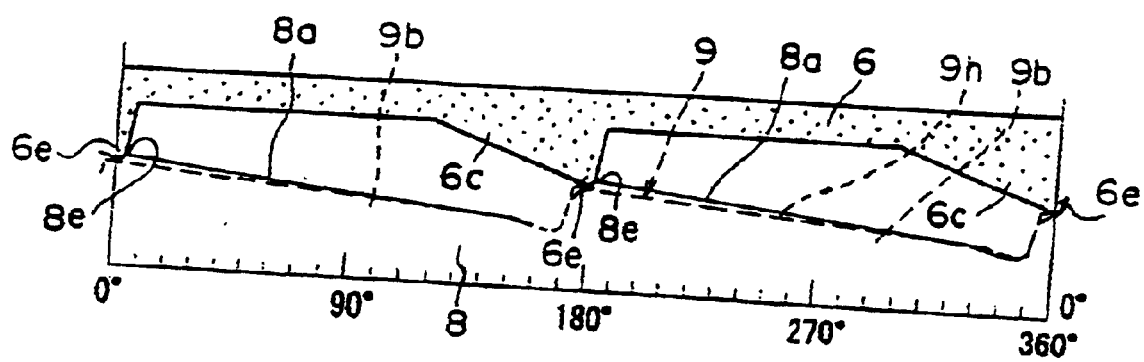
FIGS. 22a–22e are an explanatory view describing the movement of each of the cams.
Figure 22B:
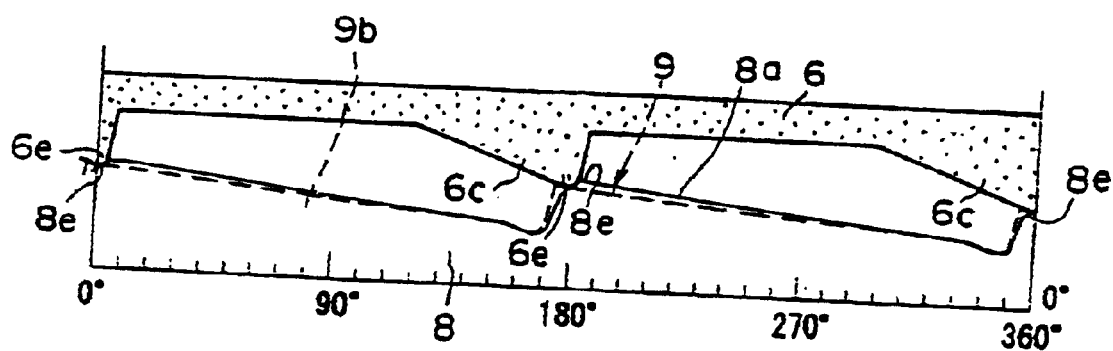

Therefore, in a state where the movable side body 3 is closed relative to the fixed side body 2 as shown in FIG. 1, the movable side body 3 and the fixed side body 2 are kept in a closed state since the arresting portions 12a and 12a of the slide key 12, as shown in FIG. 3, engage with the arresting grooves 8d and 8d of the inner cam 8 while engaging with the key grooves 9f and 9f of the outer cam 9 to arrest the rotation of the inner cam 8, and each of top portions 6e and 6e of the convex inclined cam portions 6c and 6c of the slider cam 6 are arrested in end portions 8e and 8e of each of the concave inclined cam portions 8a and 8a of the inner cam 8 as shown in FIG. 22(a).

Here, when the movable side body 3 is opened and closed manually relative to the fixed side body 2, each of the top portions 6e and 6e of the convex inclined cam portions 6c and 6c of the slider cam 6 cross over the end portions 8e and 8e of the concave inclined cam portions 8a and 8a of the inner cam 8 to perform reciprocating sliding movement according to the shapes of the respective concave inclined cam portions 8a and 8a, 9b and 9b of the inner cam 8 and the outer cam 9 so that the opening and closing operations can be performed manually.

Figure 22C:
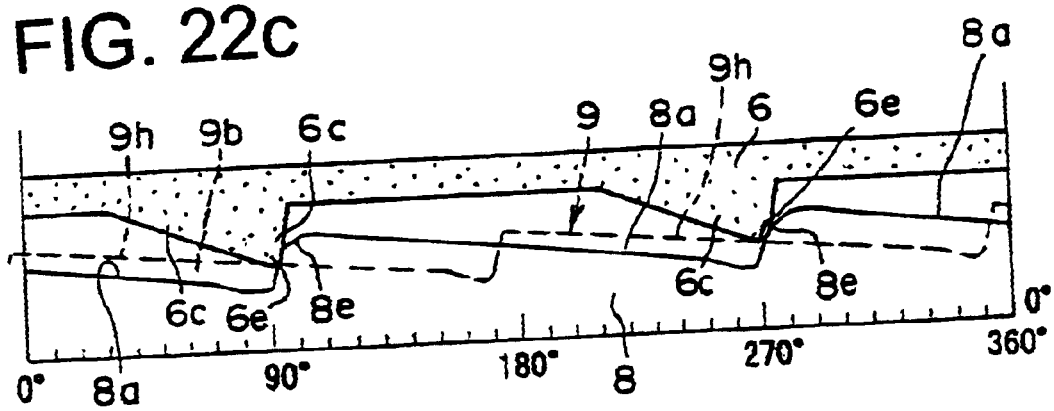

Next, in a state shown in FIG. 1, when the push-button 13 is pushed in order to automatically open the movable side body 3 relative to the fixed side body 2, the push-button 13 is pushed in lightly against a weak resilient force of the second compression spring 14, and at the same time the arresting portions 12a and 12a of the slide key 12 slide in the left direction from a state shown in FIG. 3 where they are in engagement with the arresting grooves 8d and 8d of the inner cam 8, thereby released from the arresting grooves 8d and 8d of the inner cam 8, so that the inner cam 8 is made rotatable, though the outer cam 9 is kept in the same condition as before, and the top portions 6e and 6e of the convex inclined cam portions 6c and 6c of the slider cam 6 biased slidably in one direction by the first compression spring 7 are guided by inclined surface portions 9h and 9h of the concave inclined cam portions 9b and 9b of the outer cam 9 to cause a rotation torque to the slider cam 8, thereby rotating with the shaft 5 so that the movable side body 3 is opened automatically. FIG. 22(c) shows a state in which the movable side body 3 in this case opens up to 90 degrees. At this time, if the hand is off the push-button 13, the arresting portions 12a and 12a of the slide key 12 engage with the flange portion 8c of the inner cam 8 to restrain the movement thereof in an axial direction, and as a result the push-button 13 is kept in its ON state.

Figure 22D:
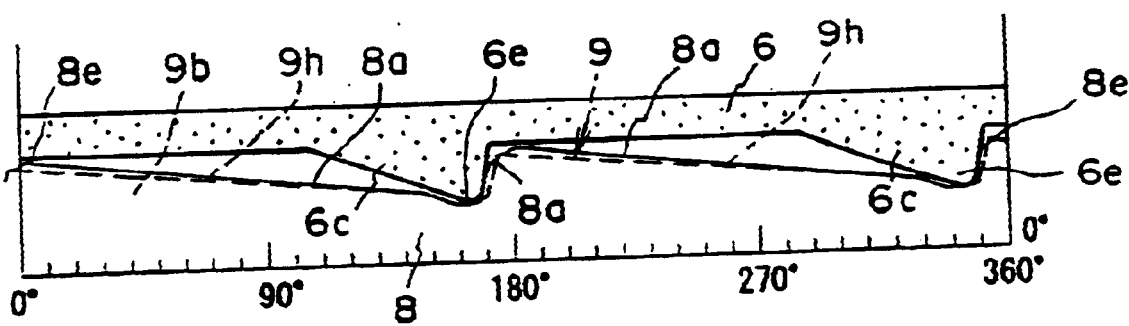
Figure 22E:
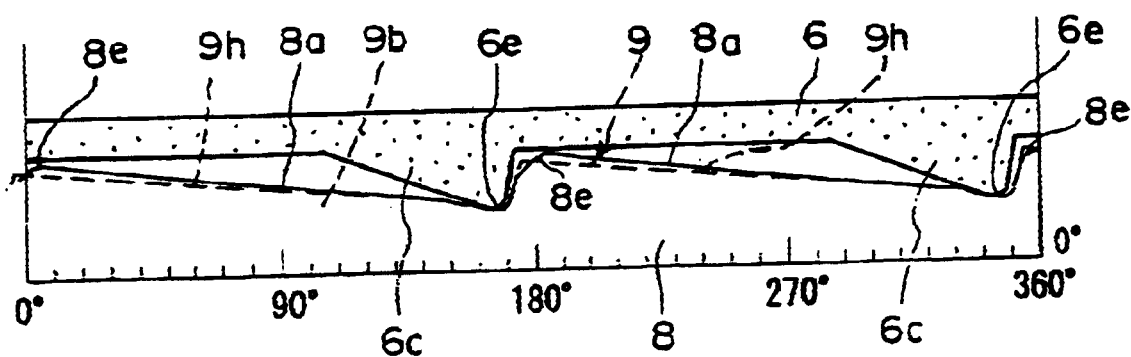

Each of the cams is spaced at the interval of 180 degrees, but in this embodiment, the opening angle of the movable side body is controlled at 165 degrees, so that the relative positions between the outer cam 9 and the inner cam 8 do not return to the original state as shown in FIG. 22(d), having a gap of about 15 degrees. This gap returns to its original state since the inner cam 8 is rotated due to the chamfered portions 12c and 12c of the arresting portions 12a and 12a when the slide key 12 engages with the arresting groove 8d and 8d of the inner cam 8.

When the movable side body 3 is closed manually from this state, the convex inclined cam portions 6c and 6c of the slider cam 6 slip on the respective concave inclined cam portions 8a and 8a, 9b and 9b of the inner cam 8 and the outer cam 9 overlapping with each other to return to a state shown in FIG. 22(a).

Figure 23:
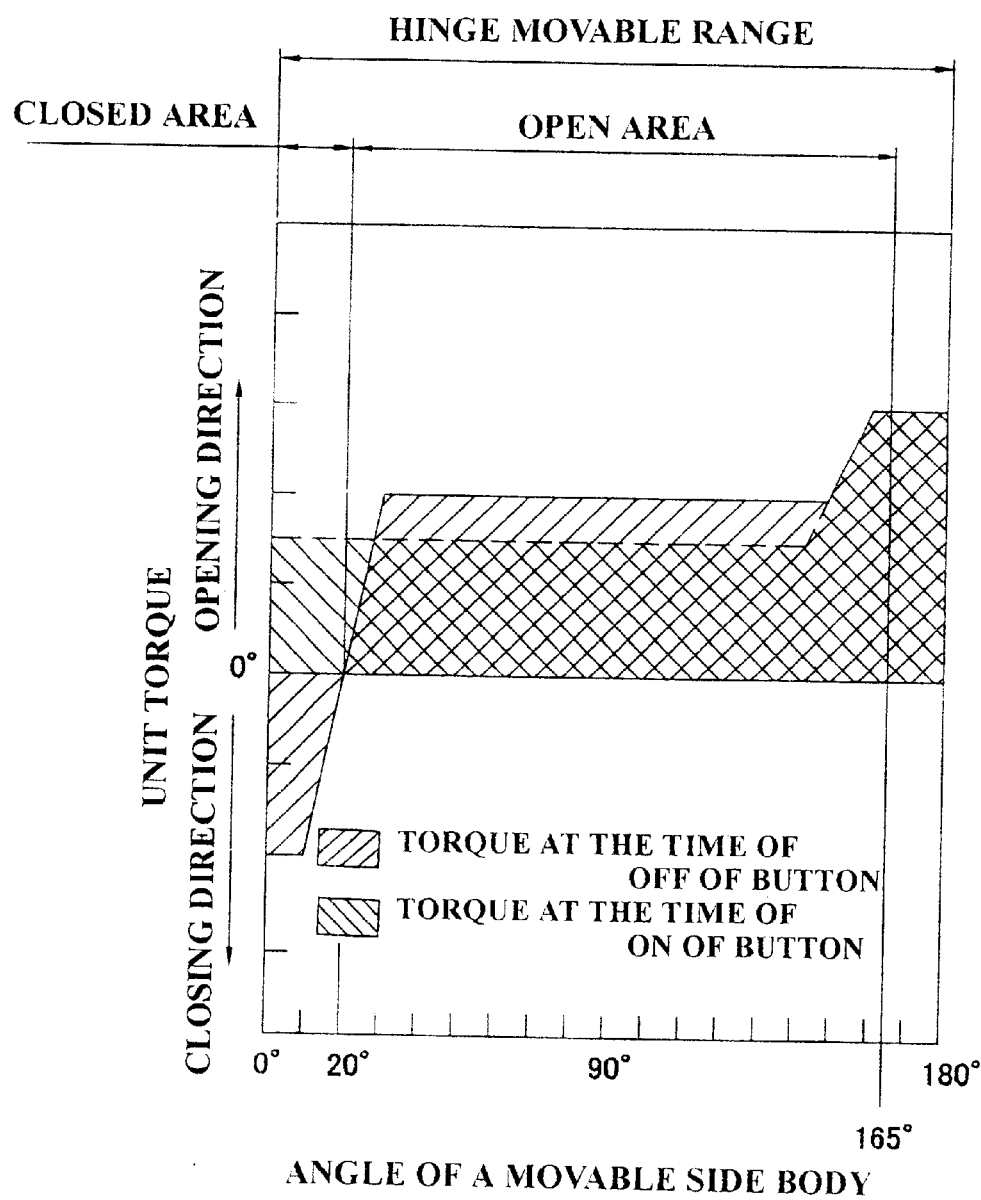
FIG. 23 is a character view of the torque of the small-sized opening and closing device according to the present invention.

FIG. 23 describes the rotation torque when the push-button 13 is in its ON state and OFF state, wherein the open and closed area of 0 (zero) degree to 20 degrees of the movable side body 3 is a closed area, and the open and closed area of 20 degrees to 165 degrees thereof is an open area. In the manual operation for opening and closing the movable side body 3 at the time of the OFF state of the push-button, the movable side body 3 is opened against the bias in the closing direction when it is in the area of the closing angle of 20 degrees, and it maintains the same torque while it is in the area from 30 degrees to 150 degrees, and then a break starts to function when it reaches around 150 degrees, while in the automatic operation for opening and closing at the time of the ON state of the push-button 13, it maintains the same torque, which is slightly less than that in the manual operation, when it is in the area of 0 (zero) degrees to 140 degrees, and the break starts to function when it reaches 140 degrees.

What is claimed is:

1. A small-sized opening and closing device comprising:

a shaft;

a slider cam attached to said shaft slidably in an axial direction, having a cam portion in one end portion thereof;

a first compression spring interposed resiliently between said slider cam and said shaft;

an inner cam attached rotatably relative to said shaft, with a cam portion provided on a side thereof facing said cam portion of said slider cam;

an outer cam attached to said shaft, accommodating said inner cam rotatably therein and having a cam portion facing said cam portion of said slider cam;

a slide key attached non-rotatably and slidably in an axial direction relative to said outer cam, for arresting and releasing said inner cam;

a push-button disposed in one end portion of said slide key; and a second compression spring interposed resiliently between said push-button and/or said slide key and said outer cam, with a weaker resilient force than that of said first compression spring.

2. A small-sized opening and closing device comprising:

a shaft including a flange portion with a baffle, a deformed shaft portion disposed in a center portion of said flange portion adjacent to said flange portion in an axial direction, a cylindrical shaft portion disposed adjacent to said deformed shaft portion in a coaxial direction, and a circumferential groove disposed in an end portion of said cylindrical shaft portion;

a slider cam having a cam portion in one end portion thereof, with said deformed shaft portion of said shaft passing slidably through a deformed through hole disposed in a center portion thereof in an axial direction;

a first compression spring interposed resiliently between said slider cam and said flange portion;

an inner cam attached rotatably to said cylindrical shaft portion of said shaft, having a second cam portion disposed on a side thereof facing said first cam portion of said slider cam to contact with each other;

an outer cam accommodating said inner cam rotatably therein, with a third cam portion disposed on a side thereof facing said second cam portion of said slider cam to contact with each other;

a slide key attached non-rotatably and slidably in an axial direction relative to said outer cam for arresting and releasing said inner cam;

a push-button disposed in one end portion of said slide key; and a second compression spring interposed resiliently between said push-button and/or said slide key and said outer cam, with a weaker resilient force than that of said first compression spring.

3. The small-sized opening and closing device according to claim 2, wherein said cam portion of said slider cam is a convex inclined cam portion, and wherein each of said cam portions of said inner cam and said outer cam is a concave inclined cam portion in substantially the same shape, said concave inclined cams overlapping with each other in a radial direction and facing said convex inclined cam, and an incoming portion of said concave inclined cam portion of said inner cam being slightly higher than that of said concave inclined cam of said outer cam portion, thereby a top portion of said convex inclined cam being kept arrested in an incoming portion of said concave inclined cam portion of said inner cam.

4. The small-sized opening and closing device according to claim 1, wherein said slide key includes an arresting leg portion in one side portion thereof having an arresting portion in a tip thereof, said arresting portion fit into a key groove disposed inside said outer cam in a slidable manner, and said arresting portion fit into and released from an arresting groove disposed in a flange portion provided in an outer circumference of said inner cam, to produce a state where said inner cam is arrested by or released from said outer cam.

5. The small-sized opening and closing device according to claim 4, wherein said arresting portion of said slide key has a chamfered portion to rotate said inner cam and return it to its original position when due to said chamfered portion said arresting portion is fit into said arresting groove of said inner cam.

6. The small-sized opening and closing device according to claim 1, wherein said shaft is engageably fixed to a mounting hole disposed in a mounting potion of a movable body, and wherein said outer cam is engageably fixed to a mounting hole disposed in a mounting portion of a fixed side body.

* * * * *